United States Patent
Anisimovich et al.

(10) Patent No.: US 9,262,409 B2
(45) Date of Patent: Feb. 16, 2016

(54) TRANSLATION OF A SELECTED TEXT FRAGMENT OF A SCREEN

(75) Inventors: Konstantin Anisimovich, Moscow (RU); Konstantin Zuev, Moscow (RU); Vladimir Selegey, Moscow (RU); Evgeny Shavlyugin, Moscow (RU)

(73) Assignee: ABBYY InfoPoisk LLC (RU)

( * ) Notice: Subject to any disclaimer, the term of this patent is extended or adjusted under 35 U.S.C. 154(b) by 732 days.

(21) Appl. No.: 13/552,601

(22) Filed: Jul. 18, 2012

(65) Prior Publication Data

US 2013/0191108 A1    Jul. 25, 2013

Related U.S. Application Data

(63) Continuation-in-part of application No. 12/187,131, filed on Aug. 6, 2008, now Pat. No. 8,548,795.

(51) Int. Cl.
| | |
|---|---|
| *G06F 17/28* | (2006.01) |
| *G06F 17/20* | (2006.01) |
| *G10L 21/00* | (2013.01) |
| *G10L 25/00* | (2013.01) |
| *G06F 17/27* | (2006.01) |
| *G06F 17/22* | (2006.01) |
| *G06F 17/26* | (2006.01) |

(52) U.S. Cl.
CPC .......... *G06F 17/289* (2013.01); *G06F 17/277* (2013.01); *G06F 17/2755* (2013.01); *G06F 17/2785* (2013.01); *G06F 17/2872* (2013.01); *G06F 17/2294* (2013.01); *G06F 17/26* (2013.01)

(58) Field of Classification Search
USPC ....................................................... 704/1–8
See application file for complete search history.

(56) References Cited

U.S. PATENT DOCUMENTS

| | | | |
|---|---|---|---|
| 4,706,212 A | 11/1987 | Toma | |
| 5,068,789 A | 11/1991 | Van Vliembergen | |
| 5,075,851 A * | 12/1991 | Kugimiya | .......... G06F 17/2755 704/2 |
| 5,128,865 A | 7/1992 | Sadler | |
| 5,146,405 A | 9/1992 | Church | |
| 5,175,684 A | 12/1992 | Chong | |
| 5,268,839 A | 12/1993 | Kaji | |

(Continued)

FOREIGN PATENT DOCUMENTS

| | | |
|---|---|---|
| EP | 2400400 A1 | 12/2001 |
| WO | 2011160204 A1 | 12/2011 |

OTHER PUBLICATIONS

Bolshakov, Igor A., Co-Ordinative Ellipsis in Russian Texts: Problems of Description and Restoration, Viniti, Academy of Sciences of USSR, Moscow, 125219, USSR, pp. 65-67.

(Continued)

*Primary Examiner* — Olujimi Adesanya
(74) *Attorney, Agent, or Firm* — LeighAnn Weiland; Veronica Weinstein

(57) ABSTRACT

Disclosed is a method for translating text fragments displayed on a screen from an input language into an output language and displaying the result. Translation may use electronic dictionaries, machine translation, natural language processing, control systems, information searches, (e.g., search engine via an Internet protocol), semantic searches, computer-aided learning, and expert systems. For a word combination, appropriate local or network accessible dictionaries are consulted. The disclosed method provides a translation in grammatical agreement in accordance with grammatical rules of the output language in consideration of the context of the text.

25 Claims, 5 Drawing Sheets

(56) References Cited

U.S. PATENT DOCUMENTS

| | | | |
|---|---|---|---|
| 5,301,109 A | 4/1994 | Landauer et al. | |
| 5,386,556 A | 1/1995 | Hedin et al. | |
| 5,418,717 A * | 5/1995 | Su | G06F 17/2715 704/9 |
| 5,426,583 A | 6/1995 | Uribe-Echebarria Diaz De Mendibil | |
| 5,475,587 A | 12/1995 | Anick et al. | |
| 5,477,451 A | 12/1995 | Brown et al. | |
| 5,490,061 A | 2/1996 | Tolin et al. | |
| 5,497,319 A | 3/1996 | Chong et al. | |
| 5,510,981 A | 4/1996 | Berger et al. | |
| 5,550,934 A | 8/1996 | Van Vliembergen et al. | |
| 5,559,693 A | 9/1996 | Anick et al. | |
| 5,677,835 A | 10/1997 | Carbonell et al. | |
| 5,678,051 A | 10/1997 | Aoyama | |
| 5,687,383 A | 11/1997 | Nakayama et al. | |
| 5,696,980 A | 12/1997 | Brew | |
| 5,715,468 A | 2/1998 | Budzinski | |
| 5,721,938 A | 2/1998 | Stuckey | |
| 5,724,593 A | 3/1998 | Hargrave, III et al. | |
| 5,737,617 A | 4/1998 | Bernth et al. | |
| 5,752,051 A | 5/1998 | Cohen | |
| 5,768,603 A | 6/1998 | Brown et al. | |
| 5,784,489 A | 7/1998 | Van Vliembergen et al. | |
| 5,787,410 A | 7/1998 | McMahon | |
| 5,794,050 A | 8/1998 | Dahlgren et al. | |
| 5,794,177 A | 8/1998 | Carus et al. | |
| 5,826,219 A | 10/1998 | Kutsumi | |
| 5,826,220 A | 10/1998 | Takeda et al. | |
| 5,848,385 A | 12/1998 | Poznanski et al. | |
| 5,873,056 A | 2/1999 | Liddy et al. | |
| 5,884,247 A | 3/1999 | Christy | |
| 5,895,446 A | 4/1999 | Takeda et al. | |
| 5,966,686 A | 10/1999 | Heidorn et al. | |
| 6,006,221 A | 12/1999 | Liddy et al. | |
| 6,055,528 A | 4/2000 | Evans | |
| 6,076,051 A | 6/2000 | Messerly et al. | |
| 6,081,774 A | 6/2000 | de Hita et al. | |
| 6,139,201 A | 10/2000 | Carbonell et al. | |
| 6,151,570 A * | 11/2000 | Fuji | 704/3 |
| 6,182,028 B1 | 1/2001 | Karaali et al. | |
| 6,223,150 B1 | 4/2001 | Duan et al. | |
| 6,233,544 B1 | 5/2001 | Alshawi | |
| 6,243,669 B1 | 6/2001 | Horiguchi et al. | |
| 6,243,670 B1 | 6/2001 | Bessho et al. | |
| 6,246,977 B1 | 6/2001 | Messerly et al. | |
| 6,260,008 B1 | 7/2001 | Sanfilippo | |
| 6,266,642 B1 | 7/2001 | Franz | |
| 6,275,789 B1 | 8/2001 | Moser et al. | |
| 6,278,967 B1 | 8/2001 | Akers et al. | |
| 6,282,507 B1 | 8/2001 | Horiguchi et al. | |
| 6,285,978 B1 | 9/2001 | Bernth et al. | |
| 6,330,530 B1 | 12/2001 | Horiguchi et al. | |
| 6,345,244 B1 | 2/2002 | Clark | |
| 6,356,864 B1 | 3/2002 | Foltz et al. | |
| 6,356,865 B1 | 3/2002 | Franz et al. | |
| 6,381,598 B1 | 4/2002 | Williamowski et al. | |
| 6,463,404 B1 | 10/2002 | Appleby | |
| 6,470,306 B1 | 10/2002 | Pringle et al. | |
| 6,601,026 B2 | 7/2003 | Appelt et al. | |
| 6,604,101 B1 | 8/2003 | Chan et al. | |
| 6,658,627 B1 | 12/2003 | Gallup et al. | |
| 6,721,697 B1 | 4/2004 | Duan et al. | |
| 6,760,695 B1 | 7/2004 | Kuno et al. | |
| 6,778,949 B2 | 8/2004 | Duan et al. | |
| 6,871,174 B1 | 3/2005 | Dolan et al. | |
| 6,871,199 B1 | 3/2005 | Binnig et al. | |
| 6,901,399 B1 | 5/2005 | Corston et al. | |
| 6,901,402 B1 | 5/2005 | Corston-Oliver et al. | |
| 6,928,448 B1 | 8/2005 | Franz et al. | |
| 6,937,974 B1 | 8/2005 | D'agostini | |
| 6,947,923 B2 | 9/2005 | Cha et al. | |
| 6,965,857 B1 | 11/2005 | Decary | |
| 6,983,240 B2 | 1/2006 | Ait-Mokhtar et al. | |
| 6,986,104 B2 | 1/2006 | Green et al. | |
| 7,013,264 B2 | 3/2006 | Dolan et al. | |
| 7,020,601 B1 | 3/2006 | Hummel et al. | |
| 7,027,974 B1 | 4/2006 | Busch et al. | |
| 7,050,964 B2 | 5/2006 | Menzes et al. | |
| 7,085,708 B2 | 8/2006 | Manson | |
| 7,146,358 B1 | 12/2006 | Gravano et al. | |
| 7,149,681 B2 * | 12/2006 | Hu | G06F 17/2785 704/2 |
| 7,167,824 B2 | 1/2007 | Kallulli | |
| 7,191,115 B2 | 3/2007 | Moore | |
| 7,200,550 B2 | 4/2007 | Menezes et al. | |
| 7,263,488 B2 | 8/2007 | Chu et al. | |
| 7,269,594 B2 | 9/2007 | Corston-Oliver et al. | |
| 7,346,493 B2 | 3/2008 | Ringger et al. | |
| 7,356,457 B2 | 4/2008 | Pinkham et al. | |
| 7,447,624 B2 | 11/2008 | Fuhrmann | |
| 7,475,015 B2 | 1/2009 | Epstein et al. | |
| 7,596,485 B2 | 9/2009 | Campbell et al. | |
| 7,672,831 B2 | 3/2010 | Todhunter et al. | |
| 7,707,025 B2 | 4/2010 | Whitelock | |
| 8,078,450 B2 | 12/2011 | Anisimovich et al. | |
| 8,145,473 B2 | 3/2012 | Anisimovich et al. | |
| 8,214,199 B2 | 7/2012 | Anismovich et al. | |
| 8,229,730 B2 | 7/2012 | Van Den Berg et al. | |
| 8,229,944 B2 | 7/2012 | Latzina et al. | |
| 8,271,453 B1 | 9/2012 | Pasca et al. | |
| 8,285,728 B1 | 10/2012 | Rubin | |
| 8,301,633 B2 | 10/2012 | Cheslow | |
| 8,402,036 B2 | 3/2013 | Blair-Goldensohn et al. | |
| 8,533,188 B2 | 9/2013 | Yan et al. | |
| 8,548,951 B2 | 10/2013 | Solmer et al. | |
| 8,577,907 B1 | 11/2013 | Singhal et al. | |
| 8,996,994 B2 * | 3/2015 | Alonichau | G06F 17/26 704/1 |
| 2001/0014902 A1 | 8/2001 | Hu et al. | |
| 2001/0029455 A1 | 10/2001 | Chin et al. | |
| 2002/0040292 A1 | 4/2002 | Marcu | |
| 2003/0004702 A1 | 1/2003 | Higinbotham | |
| 2003/0158723 A1 | 8/2003 | Masuichi et al. | |
| 2003/0176999 A1 | 9/2003 | Calcagno et al. | |
| 2003/0182102 A1 | 9/2003 | Corston-Oliver et al. | |
| 2003/0204392 A1 | 10/2003 | Finnigan et al. | |
| 2004/0098247 A1 | 5/2004 | Moore | |
| 2004/0122656 A1 | 6/2004 | Abir | |
| 2004/0167768 A1 * | 8/2004 | Travieso et al. | 704/2 |
| 2004/0172235 A1 | 9/2004 | Pinkham et al. | |
| 2004/0193401 A1 | 9/2004 | Ringger et al. | |
| 2004/0199373 A1 * | 10/2004 | Shieh | G06F 17/2827 704/2 |
| 2004/0254781 A1 | 12/2004 | Appleby | |
| 2005/0010421 A1 | 1/2005 | Watanabe et al. | |
| 2005/0015240 A1 | 1/2005 | Appleby | |
| 2005/0021322 A1 | 1/2005 | Richardson et al. | |
| 2005/0055198 A1 * | 3/2005 | Xun | 704/2 |
| 2005/0080613 A1 | 4/2005 | Colledge et al. | |
| 2005/0086047 A1 | 4/2005 | Uchimoto et al. | |
| 2005/0091030 A1 * | 4/2005 | Jessee et al. | 704/4 |
| 2005/0137853 A1 | 6/2005 | Appleby | |
| 2005/0155017 A1 | 7/2005 | Berstis | |
| 2005/0171757 A1 | 8/2005 | Appleby | |
| 2005/0209844 A1 | 9/2005 | Wu et al. | |
| 2005/0240392 A1 | 10/2005 | Munro, Jr. et al. | |
| 2006/0004563 A1 | 1/2006 | Campbell et al. | |
| 2006/0080079 A1 | 4/2006 | Yamabama | |
| 2006/0095250 A1 | 5/2006 | Chen et al. | |
| 2006/0136193 A1 | 6/2006 | Lux-Pogodalla et al. | |
| 2006/0217964 A1 | 9/2006 | Kamatani et al. | |
| 2006/0224378 A1 | 10/2006 | Chino et al. | |
| 2006/0293876 A1 | 12/2006 | Kamatani et al. | |
| 2007/0010990 A1 | 1/2007 | Woo | |
| 2007/0016398 A1 | 1/2007 | Buchholz | |
| 2007/0083359 A1 | 4/2007 | Bender | |
| 2007/0100601 A1 | 5/2007 | Kimura | |
| 2008/0195372 A1 * | 8/2008 | Chin et al. | 704/2 |
| 2009/0182548 A1 * | 7/2009 | Zwolinski | G06F 17/2735 704/3 |
| 2011/0055188 A1 | 3/2011 | Gras | |
| 2011/0301941 A1 | 12/2011 | De Vocht | |
| 2012/0023104 A1 | 1/2012 | Johnson et al. | |

(56) References Cited

U.S. PATENT DOCUMENTS

| | | |
|---|---|---|
| 2012/0030226 A1 | 2/2012 | Holt et al. |
| 2012/0131060 A1 | 5/2012 | Heidasch et al. |
| 2012/0197885 A1 | 8/2012 | Patterson |
| 2012/0203777 A1 | 8/2012 | Laroco, Jr. et al. |
| 2012/0221553 A1 | 8/2012 | Wittmer et al. |
| 2012/0246153 A1 | 9/2012 | Pehle |
| 2012/0296897 A1 | 11/2012 | Xin-Jing et al. |
| 2013/0013291 A1 | 1/2013 | Bullock et al. |
| 2013/0054589 A1 | 2/2013 | Cheslow |
| 2013/0091113 A1 | 4/2013 | Gras |
| 2013/0138696 A1 | 5/2013 | Turdakov et al. |
| 2013/0185307 A1 | 7/2013 | El-Yaniv et al. |
| 2013/0254209 A1 | 9/2013 | Kang et al. |
| 2013/0282703 A1 | 10/2013 | Puterman-Sobe et al. |
| 2013/0311487 A1 | 11/2013 | Moore et al. |
| 2013/0318095 A1 | 11/2013 | Harold |
| 2014/0012842 A1 | 1/2014 | Yan et al. |

OTHER PUBLICATIONS

Hutchins, "Machine Translation: Past, Present, Future", 1986, New York: Halsted Press, Chapters, 1, 3 and 9, 1986. pp. 1-36.

\* cited by examiner

Fig. 1

Biological evolution (from Lat. Evolutio – "Deployment") - the natural process of nature, accompanied by a change in the genetic composition of populations, the formation of adaptations, speciation, and extinction of species, transformation of ecosystems and the biosphere as a whole.

There are several evolutionary theories explaining the mechanisms underlying evolutionary processes.

Charles Darwin was the first to formulate a scientific argument for the theory of evolution by means of natural selection. Evolution by natural selection is a process that is inferred from three facts about populations. More offspring are produced than can possibly survive. Traits vary among individuals, leading to differential rates of survival and reproduction. Trait differences are heritable.

These conditions lead to the appearance of intraspecific competition and the selective elimination of the least adapted to the environment, animals, leading to an increase in the next generation the proportion of such individuals, the traits that contribute to survival and reproduction in this environment. Natural selection - the only known cause of adaptation, but not the only cause of evolution. Among the non-adaptive causes include genetic drift, gene flow and mutation.

The assumption that living organisms are subject to change, first found in Greek Presocratic philosophers. The representative of the Milesian school Anaximander held that all the animals came out of the water, and then went to the land. The man, in his views, was born in the body of the fish. In Empedocles can find ideas of homology and the survival of the fittest. Democritus believed that terrestrial animals

*Fig. 1A*

TRANSLATION OF A SELECTED TEXT FRAGMENT OF A SCREEN

CROSS-REFERENCE TO RELATED APPLICATIONS

For purposes of the USPTO extra-statutory requirements, the present application constitutes a continuation-in-part of U.S. patent application Ser. No. 12/187,131 filed on Aug. 6, 2008, which is currently co-pending, or is an application of which a currently co-pending application is entitled to the benefit of the filing date.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

FIELD

Embodiments of the invention generally relate to the field of automated translation of word combinations or natural language sentences using dictionaries and/or linguistic descriptions and various applications in such areas as automated abstracting, machine translation, applying electronic dictionaries, natural language processing, control systems, information search (including use of search engines accessible via an Internet protocol), semantic Web, computer-aided learning, expert systems, speech recognition/synthesis and others. The present disclosure is directed towards looking up translation of word combinations, sentences or parts of text on a display screen.

BACKGROUND

Many supposed modern translation systems only use a form of a machine translation system or only use electronic dictionaries for looking up word combinations or natural-language sentences while one reads printed texts or texts on a display screen. However, dictionaries are generally limited to only words and word combinations, while using a machine translation system requires more time and more electronic storage or a connection to the Internet. Thus, there is substantial room for improvement of existing translation systems for translation of blocks or fragments of text.

There is a plethora of electronic devices with display screens capable of displaying text, including devices with a touch screen, including many mobile devices, such as laptops, tablet computers, netbooks, smartphones, mobile phones, personal digital assistants (PDAs), e-book readers, and photo and video cameras. These devices are suitable for using electronic dictionaries or a machine translation system which may be installed locally, provided on a local area network, or available over the Internet.

SUMMARY

The disclosed methods generally relates to methods, computer-readable media, devices and systems for translating text fragments from an input language into an output language, and displaying translations of text selections using electronic dictionaries, machine translation, natural language processing, etc. in such applications as control systems, information searches (including use of search engines accessible via an Internet protocol), semantic Web systems, computer-aided learning systems, and expert systems.

A user can quickly obtain a translation of any selected text fragment that is shown on an electronic display screen. The translation is in grammatical agreement with the context of portions of the text corpus (the text from which the fragment originates). The disclosed method is especially useful for translation not only of certain words but any text fragment without using substantial computational resources of the device for translation of an entire document. The disclosed method also is capable of reducing the time required for translation. The disclosed method may use a variety of means and their combinations for translating. For example, a plurality or different types of dictionaries, translation memories, and different types of machine translation systems may be used. Machine translation systems may include statistical (example-based) systems and model-based MT systems.

A "fragment" may include the notion of a "sentence" and may also describe any small portion of text or refer to a paragraph, a sentence, a title, a part of a sentence, or a word combination (e.g., a noun group, verb-adverb combination).

In one embodiment, the method comprises: selecting a portion of text to be translated by using—for example—a gesture to point at an area of the display or a motion of a figure or cursor on the screen; establishing coordinates of the selected location; performing optical character recognition, if needed; identifying words, or a word combination or a set of sentences chosen or identified by the user; and translating the identified text by electronic dictionaries, machine translation or in another way. The method may also comprise displaying a translation of the selected portion of text, for example, in a balloon, in a pop-up window or in another manner on a screen of an electronic device.

An electronic device may include a client dictionary application and one or more local dictionaries. Additionally or alternatively to a local dictionary, the application may be able to access one or more remote dictionaries located on a remote server via network connection to the server, e.g. over an Internet protocol, a wireless network protocol, and a cellular telephone-like network.

Electronic dictionaries may comprise a software program and dictionary data. The program may include a shell, which provides a graphical user interface, morphology models to provide inflected forms, context search that uses an index, a teaching module, and other features.

An electronic device may also connect to a machine translation system, databases of previous translations (hereinafter "translation databases") and terminology or translation dictionary.

BRIEF DESCRIPTION OF THE DRAWINGS

FIG. 1 shows an example of displaying an English translation of a selected fragment of a Russian text, the English translation shown in a pop-up balloon-style user interface element.

FIG. 1A shows the same example of FIG. 1 wherein the underlying text is translated from Russian into English.

DETAILED DESCRIPTION

Figure 2:
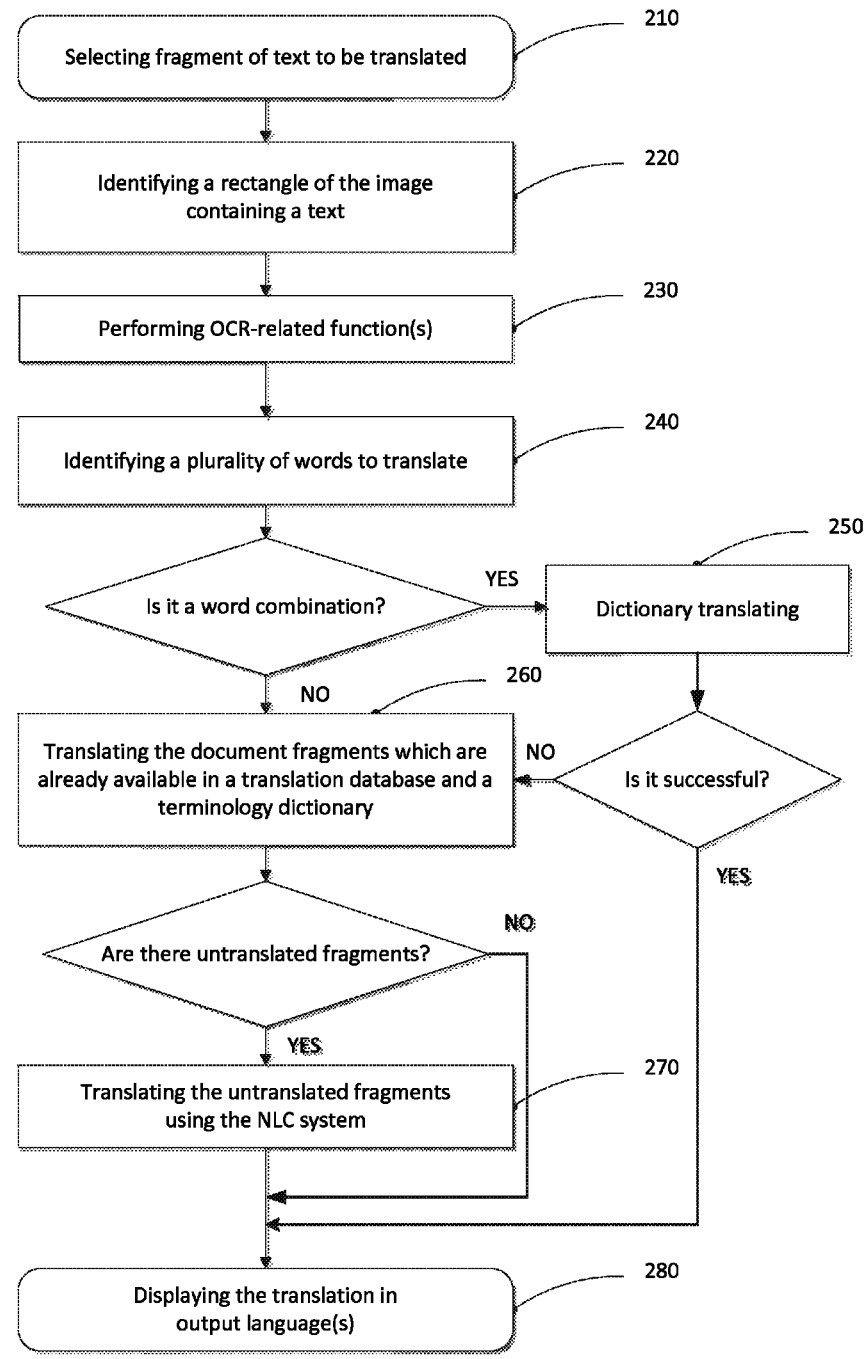
FIG. 2 shows a flowchart of operations performed during translation of selected fragment of a text.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an implementation" means that a particular feature, structure, or characteristic described in connection with the embodiment is included in at least one implementation of the invention. The appearances of the phrase "in one embodiment" or "in one implementation" in various places in the specification are not necessarily all referring to the same embodiment or implementation, nor are separate or alternative embodiments mutually exclusive of other embodiments. Moreover, various features are described which may be exhibited by some embodiments and not by others. Similarly, various requirements are described which may be requirements for some embodiments but not other embodiments.

Advantageously, the present invention discloses an electronic device with a display screen that allows a user to obtain translations of a selected fragment, for example word combination or natural-language sentences while reading a text on a display screen of the electronic device. Specifically, the translation may be displayed in a balloon, in a pop-up window, as subscript, as superscript, or in any other suitable manner when the user selects a part of a text on the display screen.

In one embodiment, when the selected fragment is not excessively large, only dictionary translating of a word and a word combination may be used. In another embodiment, if the selected fragment is relatively large, a combination of different techniques may be provided, for example, together with dictionary translation and using bases of other translations (hereinafter "translation databases"), a method of translating a text selection includes analyzing the source fragment using linguistic descriptions, constructing a language-independent semantic structure to represent the meaning of the source sentence, and generating an output sentence in the output language. To improve the efficiency and speed of translation, hybrid systems and different (successive) methods may be used.

Translation databases may be created as a result of previous translation processes made by one or many persons (translation databases may be the result of personal or group work, in-house translations or acquired from third parties, associated with or derived from particular types of documents or documents that are within or belong to some subject domain, etc.). Also, translation databases may be obtained as a result of the alignment (segmentation) of existing parallel texts. The alignment of parallel texts may be implemented manually or through some automatic method.

First of all, the system starts searching for fragments identical to the fragment selected by a user in one or more databases. If a translation for a fragment is found, the source fragment is substituted with its translation. If more than one translation variant is found (for example, if more than one database is used), the best variant may be selected either automatically or manually from the available variants. Automatic selection may be done on the basis of statistical ratings, a priori ratings or other type of ratings.

For the rest of the fragments (hereinafter the "untranslated fragments"), a fuzzy search may be used. A "fuzzy search" comprises looking for similar sentences in one or more databases. The sentences identified through a fuzzy search may differ from an "ideal match" in one or more words, but the matching words are arranged in them in the same order as in the source sentence. In this case, the differing parts can be translated using some other method, e.g., using a terminology or translation dictionary, and the slightly different translation that has been found can be substituted in.

For the remaining untranslated fragments (i.e., the fragments which have not been translated by means of the ordinary search and by means of the fuzzy search), a machine translation (MT) system, for example a Model-Based MT system, such as one disclosed in U.S. Pat. Nos. 8,195,447 and 8,214,199, may be used. The system ideally provides syntactically coherent output. Syntactic and morphological descriptions of the input and output languages are used for this purpose.

Figure 1:
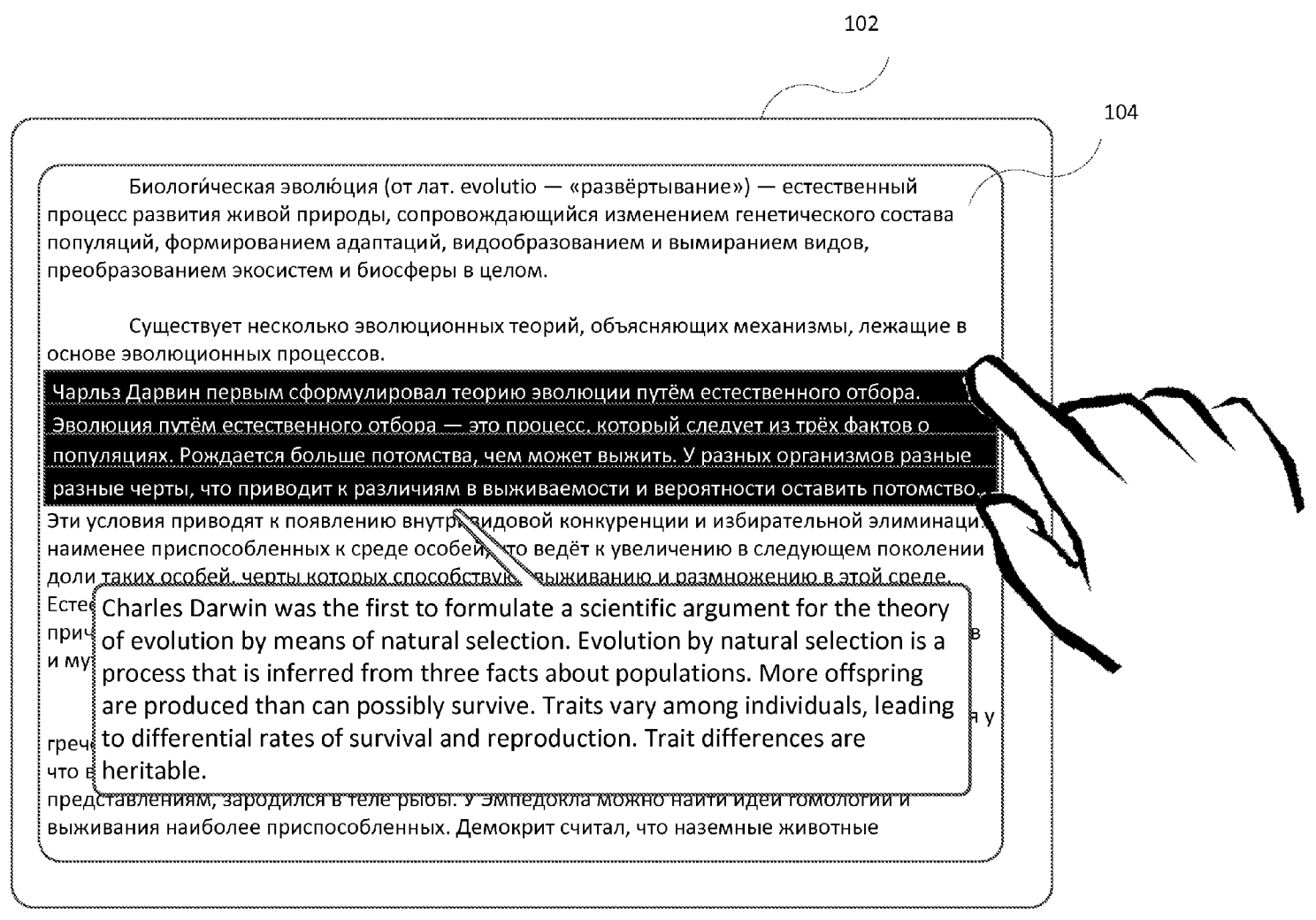
Figure 4:
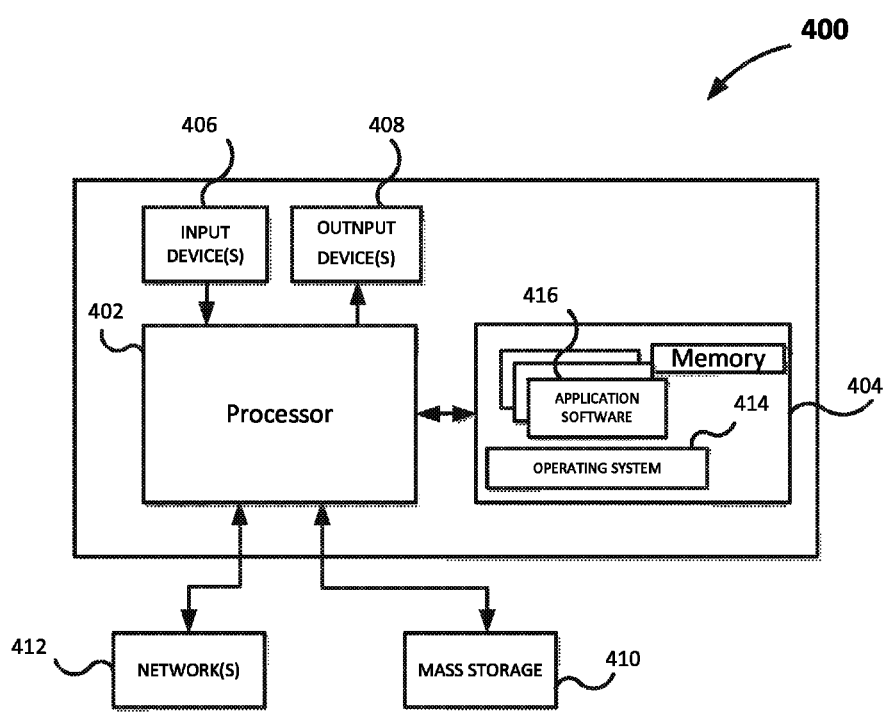
FIG. 4 shows an exemplary architecture for implementing an electronic device that is capable of performing the operations of the invention.

FIG. 1 shows an example of displaying a translation of a selected fragment of a Russian text into English. The English translation is shown in a pop-up balloon-style user interface element. With reference to FIG. 1, the electronic device 102 may comprise a computer system, such as a general purpose computer, embodied in different configurations such as a desktop personal computer (PC), laptop computer, smartphone, cell phone, tablet computer, digital camera, or another gadget or device having a display screen, display projector or display element. FIG. 4 of the drawings shows an exemplary hardware and system architecture for implementing an electronic device 102 in accordance with one embodiment (described further below).

To look up a fragment that appears in non-text or non-text-encoded files, for example in .JPG, .TIFF or .PDF files, the user's electronic device may include optical character recognition (OCR) algorithms, hardware, firmware or software which identifies a relevant region on the image where the selected fragment is located and then converts the image in the region into a text format. OCR may also be performed using a remote server or other device, which receives an image and an indication for an identified area from the device displaying the image of text, applies OCR processing so as to ascertain the word or words at issue, and returns the recognized fragment to the device displaying the image of text. The remote server may be accessible via a data path that includes a wired or wireless data path, internet connection, Bluetooth® connection, etc.

FIG. 1 of the drawings illustrates an example of an electronic device 102, comprising a display screen 104. The content on the display screen or touch screen 104 may be presented in a container or software application such as a text browser, in a text or word processor (e.g., Adobe® Acrobat®, e-book reader, a Web browser, e-mail client, a text message user interface), or in an image display application or another appropriate application that provides text to the display screen 104. In the case when text is presented in a non-editable format, such as in a .PDF, .JPG, .TIFF file format, an OCR operation may be required. In FIG. 1, a balloon user interface element appears on the screen 104 and includes a translation of a selected portion of the underlying text.

FIG. 2 shows a flowchart of operations performed by an application during translation of a selected fragment of a text. When the user reads a text on the display screen 104 of the electronic device 102 and wishes to look up a translation of a fragment, the user simply points to an area containing text with a mouse cursor or touches and moves a finger or cursor on the screen thereby selecting the corresponding region on the display screen 104 with a finger, a stylus or any other suitable object or mechanism.

The mode of selection of a text may be preliminarily preset by a user. For example pre-selection may be done by directing a cursor or touching a screen on some point at or near a word, word combination, sentence or paragraph to make a selection of a text fragment. Or, selection of a text fragment may be done by using a gesture to point at an area of the display, for example, by moving a finger cursor on the screen.

The process of selecting a fragment of a text 210 initiates a process that ultimately enables the user to see a translation of the text fragment.

If the coordinates point to an area of an image (e.g. .PDF, .JPG, .TIF, and other picture or image formats where words are not stored as collections of encoded characters), an OCR algorithm, process or software is applied. At step 220, OCR software identifies a rectangular region corresponding to the user input that contains text. To speed up recognition, the OCR software may identify a smallest rectangular image that includes an image of the word or word string in the area touched or indicated by the user.

At step 230, the OCR software operates on the identified rectangular region. The result of the OCR processing is recognized words, word combinations or sentences represented by a string of encoded characters—a text fragment. For example, the encoded characters may be a set of ASCII-encoded characters. So, at step 240 there is a text fragment (e.g., a plurality of words) identified, selected and available to be translated.

Further, it is determined whether the selected and recognized fragment of a text is a word combination. The word combination may be a string containing not more than several words, for example, 4. If the selected fragment is a word combination, a dictionary translation is performed at step 250. Otherwise, at step 260 the translation of a selected and recognized fragment of text is performed by, for example, using a "translation database" or terminology dictionary, and if available efforts are not successful, by means of a machine translation system. The terminology dictionary may include relatively long word combinations or specific word combinations, such as words or expressions used in a specific field (e.g., medicine, law, law enforcement, military), or may include a phrase or expression which should be or can be divided into smaller word combinations. The process 260 is run also in a case where an appropriate variant of the translation is not found in through dictionary translation.

At step 260, the document fragments which are already available in a translation database are substituted with their translations. The selected text may be divided into smaller fragments automatically by employing a special algorithm. For example, fragments may be identified based on sentence boundaries or based on paragraph boundaries. Finally, the following search method may be used to find the required fragment: the system each time looks in the database for the longest fragment which starts with the current word. Searches in the translation database may be performed in many different ways depending on the structure of the database. In particular, if the translation database is supplied with an index, the index may be used for improving the speed of searches.

Additionally, for those fragments for which no translation is available in the translation database, a terminology dictionary or a translation dictionary may be used. In particular, a terminology dictionary or a translation dictionary may be used to translate headings, titles, and table cells where specialized words, shortened and non-standard expressions are more common than in complete sentences.

Then, if the selected text fragment still includes untranslated portions or words, a machine translation system is used at step 270. For example, machine translation systems, such as those disclosed in U.S. Pat. Nos. 8,195,447 and 8,214,199, may be used. These systems exploit exhaustive linguistic descriptions of the source and output languages. The linguistic descriptions useful for translating the source text into another language may include morphological descriptions, syntactic descriptions, lexical descriptions, and semantic descriptions. In some cases, all available linguistic models and knowledge about natural languages may be arranged in a database and used during analysis of a source sentence and synthesis an output sentence. Integral models for describing the syntax and semantics of the source language are used in order to (1) recognize the meanings of the source sentence analyze, (2) translate complex language structures, and (3) correctly convey information encoded in the source text fragment. After that, all pieces of translations, provided by different ways, are combined for displaying.

At step 280, a system displays a translation in an output language. Specifically, the translation may be displayed in a balloon, in a pop-up window, as subscript, as superscript, or in any other suitable manner when the user selects part of a relatively lengthy text on the display screen.

Figure 3:
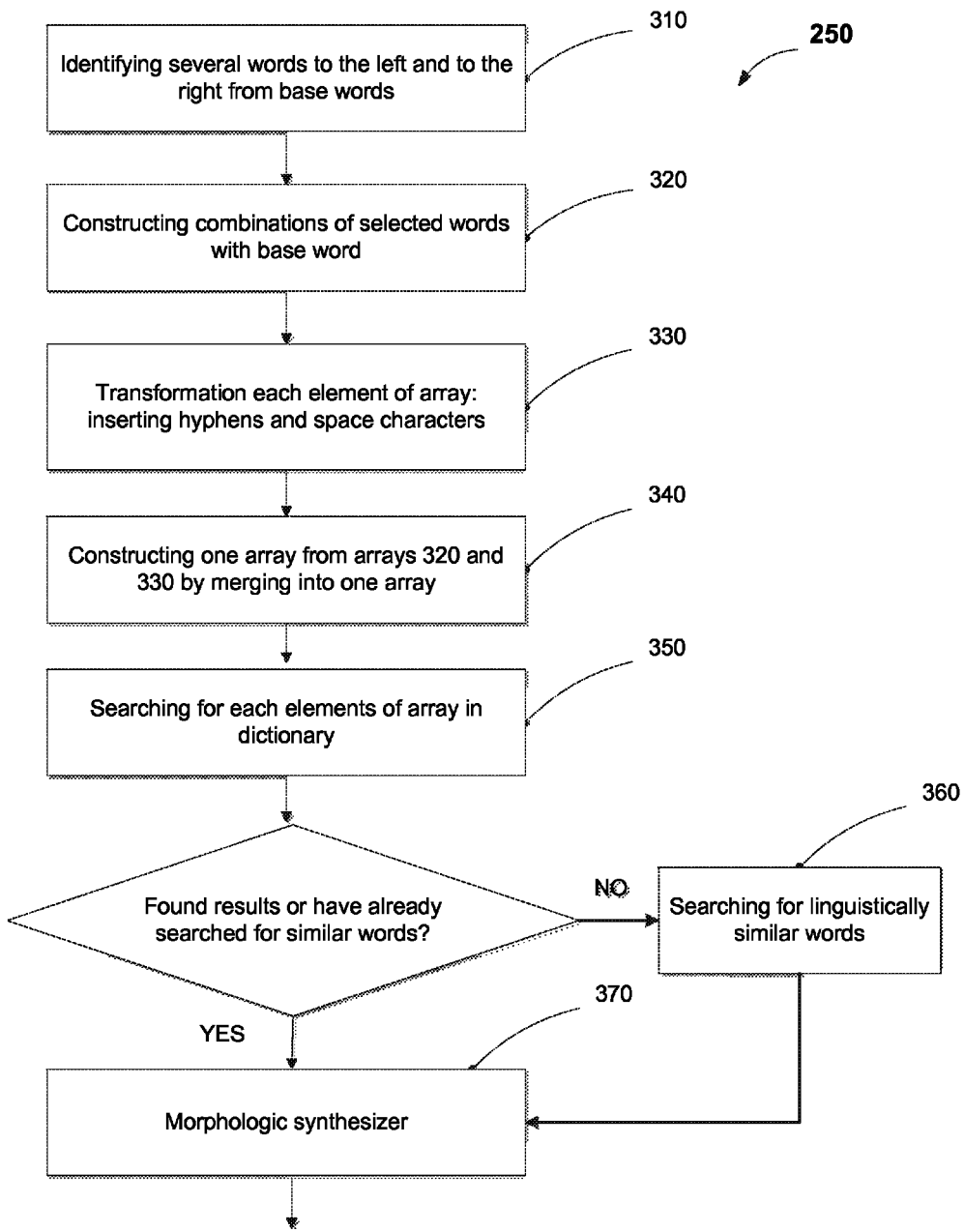
FIG. 3 shows a flowchart of operations performed during translation of word combination.

FIG. 3 shows a flowchart of operations performed by an application or set of computer processor instructions during translation of a word combination in step 250 of FIG. 2. With reference to FIG. 3, first, step 310 is performed: identifying several words from the left and several words from the right of the base word from surrounding text—assuming there is some text surrounding the text fragment selected by a user. If the selected text fragment is a single word, this word is considered to be the base word. At least two words from each side from the base word are identified. If the selected text fragment includes two or more words, any word from this selected text fragment may be considered as a base word. For example, the first word from the selected fragment may be considered the base word.

Next, at step 320 combinations using the base word are constructed from words identified at step 310. As a result of this process, an array containing all possible word combinations is generated.

Then, at step 330, a processing of each element of the array constructed in the preceding step is performed. Array processing includes for each combination (word combination) inserting a hyphen in place of each space character and inserting a space character in place of a hyphen. Thus, all possible spellings are taking into account.

After that, two arrays, extracted from steps 320 and 330, are merged into one array in step 340. At step 350, each word combination of the merged array from step 340 is searched in an available dictionary or set of dictionaries that may be preliminarily selected by user or may be programmatically or automatically made available. Dictionary software may use by default one or more dictionaries or a user may specify one or more desired dictionaries. A default dictionary on a given subject may be selected if the dictionary software determines that the text belongs to a specialized subject (e.g., medicine, law, automobiles, computers). Additionally, the electronic dictionary includes a morphology module, so that the query word or word combination need not be in a base, or "dictionary" form—the morphology module identifies the base form of an inflected form. If more than one base form is possible, the morphology module identifies possible alternatives. Also, in some cases, the morphology module may determine a grammatical form of the source word, for example, a number for nouns or form of verbs, to select a proper form for the translation in an output language.

In some cases, the system may determine a part of speech of a selected word by using words to the left and to the right of the base word. This option can considerably reduce a list of variants of translation by offering only those translation variants whose part of speech correspond to the part of speech of a base word in an input language. For example, if a machine translation system establishes that the selected word is a noun, it will offer only nouns as variants of translation. This option helps to save time, storage or memory space, bandwidth, etc.

Some rules may be assigned in accordance with the system defining a part of speech. For example, if there are articles "a" or "the", possessive pronouns "my", "yours" etc. from the left of a base word, the system may make a conclusion that the base word is a noun.

In addition, the disclosed method may utilize the information about a subject area of translation in accordance with a context. For example, the notion "context" refers to the previously translated fragment or refers to words located to the left or right from the base word(s). In most cases, a word can have several meanings and therefore there are several alternative translations into another language. So it is necessary to determine in accordance with the context which meaning is presented in the source text and which variant of translation should be selected. For example, to translate the English word "file", which the system assumes to be a noun, the system will select the translation equivalent meaning a "computer file" if it is translating a text about computers and software. If the system is translating a text about document management, it will select the translation equivalent meaning a "dossier, a folder containing paper documents." And if the system is translating a text about tools, it will select the translation which means "a machinist's file." The defining of subject area may be performed in different ways, for example by using previously translated and cached fragments, by using the title of the text or by manually specifying by user a particular subject matter.

At step 360, if no translation is found in the dictionaries for a particular word or word combination, a search for linguistically similar words is performed. It may be possible that the word or word combination is a misprint, for example, a typographical error may be present in the text fragment. In such case, variants of substitution of the particular word or word combination may be suggested to the user.

At step 370 a morphologic synthesizer is activated. The morphologic synthesizer receives as input a set of word-by-word translated words in their initial forms, analyzes them based on morphological rules and provides an output of translation in a form that is in grammatical agreement with the context of the translated fragment.

For example, the word combination "with virtual memory" is selected by a user as a fragment for translation. As a result of performing the above-described steps, the word combination "virtual memory" is identified in a dictionary during translation from the English language into the German language. In German language word combination "virtual memory" is translated as "virtueller Speicher." Both words in this word combination are in their initial forms. Besides, the word combination "virtueller Speicher" has no grammatical agreement with the German preposition, "mit". That is one example showing why at this stage the morphologic synthesizer is activated, it is highly useful to correctly translate specific word combinations.

Without such a morphologic synthesizer, a direct word-by-word translation of the word combination "with virtual memory" is incorrectly provided: "mit virtueller Speicher."

A certain word may have several variants of translation. The choice of a variant of translation for each word in a word combination may be implemented, for example, in accordance with the field of the source text, if it is known, with a markup in a dictionary or in accordance with a most frequent usage. Other methods may be used to select the variant of translation.

Further, returning to the "with virtual memory" example, in accordance with morphological rules, the morphologic synthesizer determines that the German preposition "mit" requires control in a dative case. As a result, a noun and adjective combination acquires a form in a dative case: "virtuellem Speicher". So, such morphologic synthesizer is able to deliver a more grammatically consistent word combination: "mit virtuellem Speicher" by being programmed to process and respond appropriately to parts of speech, cases, plurality, tenses, etc.

With reference to FIG. 2, if the morphologic synthesizer and dictionary translating 250 are successful, at step 280, the translation of a word combination in an output language is displayed, for example, in a balloon, in a pop-up window or in another manner on the screen of the electronic device.

FIG. 4 of the drawings shows hardware and system architecture 400 that may be used to implement the user electronic device 102 in accordance with one embodiment of the invention in order to translate a word or word combination, to display the found translations to the user, to choose the alternative of the translation and its word form, and to insert the choice in the displayed text. Referring to FIG. 4, the exemplary system 400 includes at least one processor 402 coupled to a memory 404 and has a touch screen among output devices 408, which, in this case, also serves as an input device 406. The processor 402 may be any commercially available CPU. The processor 402 may represent one or more processors (e.g. microprocessors), and the memory 404 may represent random access memory (RAM) devices comprising a main storage of the system 400, as well as any supplemental levels of memory, e.g., cache memories, non-volatile or back-up memories (e.g. programmable or flash memories), read-only memories, etc. In addition, the memory 404 may be considered to include memory storage physically located elsewhere in the hardware 400, e.g., any cache memory in the processor 402 as well as any storage capacity used as a virtual memory, e.g., as stored on a mass storage device 410.

The system 400 also typically receives a number of inputs and outputs for communicating information externally. For interface with a user or operator, the hardware 400 usually includes one or more user input devices 406 (e.g., a keyboard, a mouse, touch screen, imaging device, scanner, etc.) and a one or more output devices 408, e.g., a display device and a sound playback device (speaker). To embody the present invention, the system 400 may include a touch screen device (for example, a touch screen), or an interactive whiteboard, or another device which allows the user to interact with a computer by touching areas on the screen. The keyboard is not obligatory for embodiments of the present invention.

For additional storage, the hardware 400 may also include one or more mass storage devices 410, e.g., a removable drive, a hard disk drive, a Direct Access Storage Device (DASD), an optical drive, e.g. a Compact Disk (CD) drive and a Digital Versatile Disk (DVD) drive. Furthermore, the system 400 may include an interface with one or more networks 412 (e.g., a local area network (LAN), a wide area network (WAN), a wireless network, and/or the Internet among others) to permit the communication of information with other computers coupled to the networks. It should be appreciated that the system 400 typically includes suitable analog and/or digital interfaces between the processor 402 and each of the components 404, 406, 408, and 412 as is well known in the art.

The system 400 operates under the control of an operating system 414, and executes various computer software applications 416, components, programs, objects, modules, etc. to implement the techniques described above. In particular, the computer software applications include the client dictionary application and also other installed applications for displaying text and/or text image content such a word processor, dedicated e-book reader etc. Moreover, various applications, components, programs, objects, etc., collectively indicated by reference 416 in FIG. 4, may also execute on one or more processors in another computer coupled to the system 400 via a network 412, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described.

We claim:

1. A computer-implemented method for translating a text fragment in an input language into an output language, the method comprising:
   receiving an indication of a selection of an area that includes text displayed on a screen of a device;
   identifying the text fragment based on the indication of the selection of the area that includes text;
   performing a dictionary lookup of the text fragment, wherein performing the dictionary lookup of the text fragment comprises:
      identifying several words in a left direction and identifying several words in a right direction from a base word of the text fragment;
      constructing combinations of the identified words with the base word;
      transforming each element of an array by inserting hyphens and space characters between portions of the base word and identified words;
      searching for each element of the array in an electronic dictionary; and
      searching for a linguistically similar word or word combination in an electronic dictionary; and
      providing an output of translation in a form that is in grammatical agreement with a context of the translated fragment using a morphologic synthesis;
   for each remaining untranslated portion of the text fragment for which a translation is not readily available, translating said untranslated portion of the text fragment based on a machine translation technique; and
   displaying the translation of the text fragment on the screen of the device, wherein the translation is displayed upon selecting the text fragment on the screen.

2. The method of claim 1, wherein the identifying the text fragment includes performing an optical character recognition.

3. The method of claim 1, wherein the translation alternatives are in a language different from the language of the text fragment.

4. The method of claim 1, wherein selecting the text fragment may be done manually in a haptic-based or in a cursor-based manner.

5. The method of claim 1, wherein identifying the text fragment includes identifying a sentence boundary or a paragraph boundary.

6. The method of claim 1, wherein the method further comprises, prior to performing the dictionary lookup of the text fragment, identifying variants of the text fragment using linguistic descriptions and constructing a language-independent semantic structure to represent a meaning of a source sentence associated with the text fragment.

7. The method of claim 1 wherein performing the dictionary lookup further comprises selecting and using a translation dictionary for a given subject domain.

8. The method of claim 1, wherein performing the dictionary lookup of the text fragment further comprises performing a morphological analysis for identifying a base form of words of the text fragment.

9. The method of claim 1, wherein performing the dictionary lookup of the text fragment further comprises performing a morphological synthesis that determines grammatical forms of words in the text fragment and provides a grammatically agreed translation that is in grammatical agreement in accordance with grammatical rules of the output language.

10. The method of claim 1, wherein performing the dictionary lookup of the text fragment further comprises selecting a variant of translation based on a most frequent usage or in accordance with a subject field of the source text.

11. The method of claim 1, wherein performing the translation of the text fragment further comprises selecting and using a translation database, and wherein the translation database is derived from previous translation processes or segmentation of existing parallel texts.

12. The method of claim 1, wherein performing the translation of the text fragment includes usage of terminology dictionaries for a given subject domain.

13. The method of claim 1, wherein the machine translation technique includes a model-based machine translation technique, wherein the model-based machine translation technique comprises using linguistic descriptions to build a semantic structure to represent a meaning of each untranslated fragment, and wherein the method further comprises providing a syntactically coherent translation.

14. The method of claim 1, wherein the displaying the translation of the text fragment comprises displaying a translation in the form of one of a pop-up window, a superscript text, a subscript text, and a text balloon.

15. A device for translating a text fragment in an input language into an output language, the device comprising:
 a processor;
 a memory in electronic communication with the processor, wherein the memory is configured with instructions to cause the processor to perform actions comprising:
  receiving an indication of a selection of an area that includes text displayed on a screen of a device;
  identifying the text fragment based on the indication of the selection of the area that includes text;
  performing a dictionary lookup of the text fragment, wherein performing the dictionary lookup of the text fragment comprises:
   identifying several words in a left direction and identifying several words in a right direction from base words of the text fragment;
   constructing combinations of the identified words with base words;
   transforming each element of an array by inserting hyphens and space characters between portions of the base words and identified words;
   searching for each element of the array in an electronic dictionary; and
   searching for a linguistically similar word or word combination in an electronic dictionary; and
   providing output of translation in a form that is in grammatical agreement with a context of the translated fragment using a morphologic synthesis;
  for each portion of the text fragment for which a translation is readily available,
   translating said portion of the text fragment based on said readily available translation;
  for each remaining untranslated portion of the text fragment for which a translation is not readily available,
   translating said untranslated portion of the text fragment based on a machine translation technique; and
  displaying the translation of the text fragment on the screen of the device, wherein the translation is displayed upon selecting the text fragment on the screen.

16. The device of claim 15, wherein selecting text fragment may be done manually in a haptic-based or in a cursor-based manner.

17. The device of claim 15, wherein identifying the text fragment includes identifying a sentence boundary or a paragraph boundary.

18. The device of claim 15, wherein dictionary lookup includes selecting the translation dictionary for a given subject domain.

19. The device of claim 15, wherein performing the dictionary lookup of the text fragment includes morphological analysis for identifying a base form of words of the text fragment.

20. The device of claim 15, wherein performing the dictionary lookup of the text fragment includes performing a morphological synthesis that determines a grammatical form of words in the text fragment, and wherein the method further comprises providing a translation that is in grammatical agreement with grammatical rules of the output language.

21. The device of claim 15, wherein performing the dictionary lookup of the text fragment includes selecting a variant of translation based on a frequency of use or in accordance with a topic field of the source text.

22. The device of claim 15, wherein performing the translation of the text fragment includes selection and use of a translation database, and wherein the translation database is derived from a previous translation or segmenting existing parallel texts.

23. The device of claim 15, wherein performing the translation of the text fragment includes use of a terminology dictionary for a subject domain.

24. The device of claim 15, wherein the machine translation technique includes a model-based machine translation technique, wherein the model-based machine translation technique comprises use of linguistic descriptions to build a semantic structure to represent a meaning of each untranslated fragment, and wherein the method further comprises providing a syntactically coherent translation.

25. The device of claim 15, wherein the displaying the translation of the text fragment comprises displaying a translation of the text fragment in the form of one of a pop-up window, a superscript text, a subscript text, and a text balloon.

* * * * *